United States Patent [19]

Becherer et al.

[11] Patent Number: 4,586,311

[45] Date of Patent: May 6, 1986

[54] APPARATUS FOR REMOVING STRIPS OF PHOTOSENSITIVE MATERIAL FROM FLAT ENVELOPES

[75] Inventors: Walter Becherer, Munich; Erwin Geyken, Neubiberg; Nikolaus Jelinek, Munich; Franz Lechner, Grafing; Helmut Schausberger, Munich, all of Fed. Rep. of Germany

[73] Assignee: Agfa-Gevaert Aktiengesellschaft, Leverkusen, Fed. Rep. of Germany

[21] Appl. No.: 498,132

[22] Filed: May 25, 1983

[30] Foreign Application Priority Data

Jun. 4, 1982 [DE] Fed. Rep. of Germany ....... 3221220

[51] Int. Cl.$^4$ .............................................. B65B 43/26
[52] U.S. Cl. .................................... 53/381 R; 53/492; 83/425.2; 414/412
[58] Field of Search ............. 53/381 A, 381 R, 266 C, 53/492; 83/870, 874, 912, 178, 425.2; 156/247, 248, 344, 584; 242/56 R, 67.3 R; 414/411, 412, 416

[56] References Cited

U.S. PATENT DOCUMENTS

| | | | |
|---|---|---|---|
| 3,050,917 | 8/1962 | Verhoeven | 53/381 R |
| 3,477,896 | 11/1969 | Townsend et al. | 156/584 |
| 3,640,480 | 2/1972 | Schleich | 242/56 R |
| 3,922,778 | 12/1975 | Aalpoel | 53/381 R X |
| 3,927,844 | 12/1975 | Bond et al. | 242/67.3 R X |
| 4,183,751 | 1/1980 | Matsumoto et al. | 156/584 X |
| 4,196,040 | 4/1980 | Houck | 156/584 |
| 4,273,606 | 6/1981 | Trilli | 156/344 X |
| 4,327,878 | 5/1982 | Fauchier, II et al. | 242/67.3 R |
| 4,416,718 | 11/1983 | Fair | 156/584 X |

FOREIGN PATENT DOCUMENTS 2747265 4/1979 Fed. Rep. of Germany ...... 156/584

Primary Examiner—John Sipos
Assistant Examiner—Steven P. Weihrouch
Attorney, Agent, or Firm—Peter K. Kontler

[57] ABSTRACT

Apparatus for removing strips of X-ray film from elongated flat envelopes, wherein the film is flanked by two foils of lead, has a table supporting two blade-like tools whose tips can be introduced into the open front end of an envelope so that each tool enters between a panel of the envelope and the outer side of the respective foil. The envelope is then advanced lengthwise so that the tools penetrate deeper into its interior whereby the envelope is severed along opposite marginal portions of the film by knives which are mounted on one of the tools. One of the panels is introduced into the nip of two advancing rolls downstream of the knives so that the one panel then pulls the envelope forwardly and the envelope is automatically opened by the knives. The leader of the exposed film is connected to the core of a reel which is driven in synchronism with the advancing rolls so that the film is convoluted onto the core of the reel. The separated panels of the envelope are deflected into a bin and the foils are caused to descend by gravity into collecting receptacles between the tools and the reel. The knives have cutting edges which are inclined with reference to the direction of advancement of the envelope.

29 Claims, 3 Drawing Figures

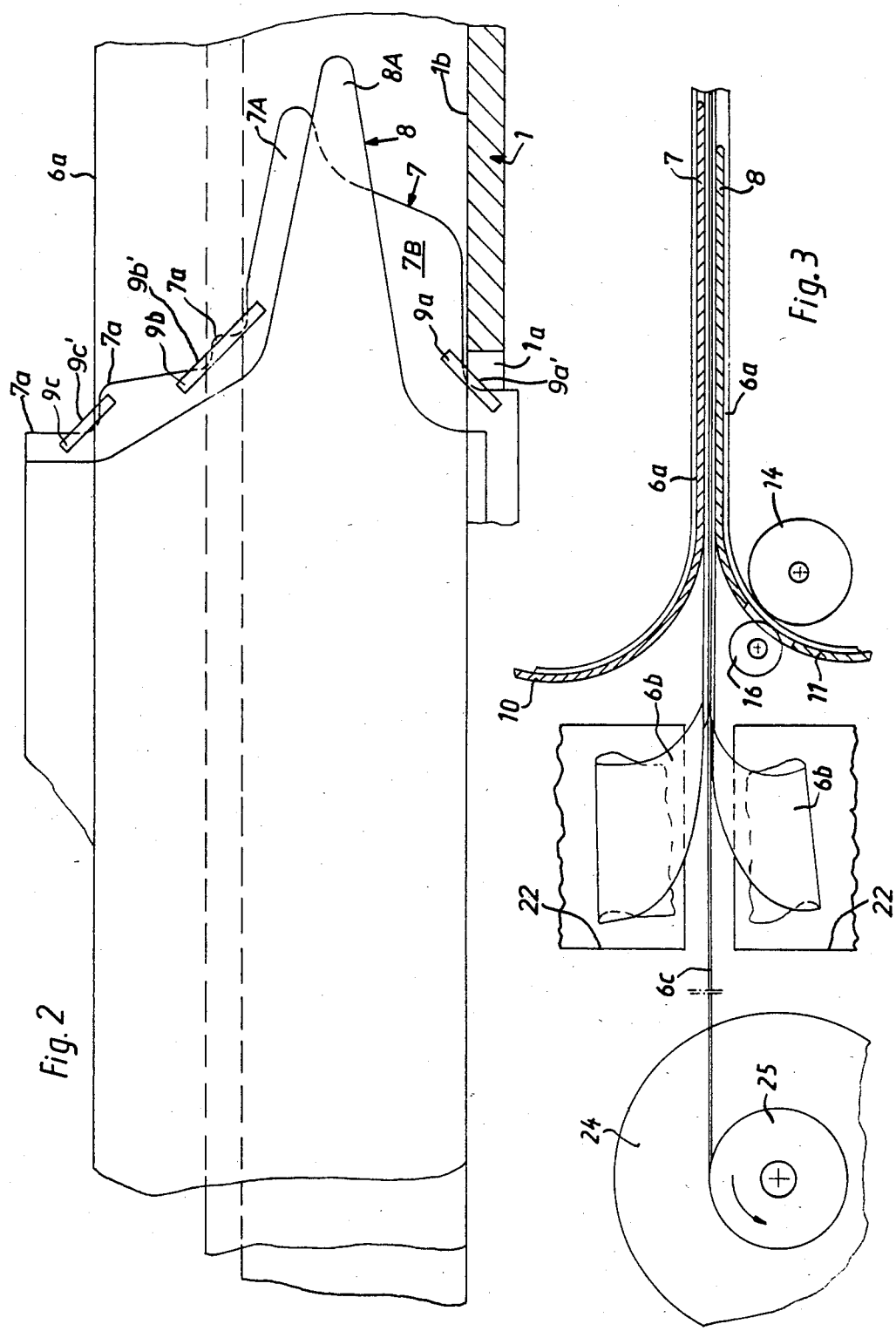

APPARATUS FOR REMOVING STRIPS OF PHOTOSENSITIVE MATERIAL FROM FLAT ENVELOPES

BACKGROUND OF THE INVENTION

The present invention relates to apparatus for manipulating flat elongated envelopes, particularly for opening envelopes which contain strips or webs of photosensitive material.

It is known to confine strips of photosensitive material in flat elongated envelopes or sheaths which are made of paper and/or synthetic plastic material. It is also known to place such strips between metallic foils, particularly between foils which are made of or contain lead. The dimensions of the envelopes are selected in such a way that the strips of photosensitive material are confined therein with minimal clearance or with no clearance at all, i.e., each envelope constitutes an elongated flat sheath-like body having two panels which are joined to one another along both marginal portions of the confined strip. Such envelopes are often employed for confinement of X-ray films, particularly X-ray films which are intended for use in the industry. An envelope of considerable length is normally stored in convoluted condition on the core of a reel, and requisite lengths of the envelope are severed from the stored supply when the need arises. The length of detached portions of the envelope varies within a very wide range, e.g., between 0.5 m and 50 m, depending on the intended use of the strips therein. The strips are exposed while confined in the envelopes, and the envelopes are thereupon opened in a dark chamber so as to allow for removal of the exposed strips from their interior. The opening involves severing of the envelopes along the two marginal portions of the confined strips of exposed photosensitive material, i.e., in the regions where the panels of the envelopes are joined to each other and define pronounced fold lines or creases along the respective edges of the strips. Thus, the edges of the strips extend all the way to the respective fold lines. This complicates the opening of envelopes, especially if they contain strips of the type wherein the emulsion extends all the way to the edges. For example, such types of photosensitive material are used for the making of mammographs. Manual extraction of exposed strips from intact envelopes, i.e., from envelopes which are not severed along one or both edges of the strips, is practically impossible, especially if the strips are long, because the strips are confined between the respective panels with little clearance or with no clearance at all. As a rule, the envelopes are introduced into a dark chamber and are cut open lengthwise by hand. Such operation is time consuming and the operator is likely to scratch the exposed photosensitive material during opening and separation of the envelopes.

OBJECTS AND SUMMARY OF THE INVENTION

An object of the invention is to provide an apparatus for opening flat envelopes or sheaths for strips of photosensitive material or the like in a time saving operation and without scratching and/or otherwise damaging the strips.

Another object of the invention is to provide an apparatus which can be used for automatic removal of strips of photosensitive material or the like from short or long envelopes and/or from wide or narrow envelopes.

A further object of the invention is to provide an apparatus which is constructed and assembled in such a way that it does not require any changes in setup when the operators desire to open a relatively wide envelope after having opened one or more narrower envelopes, or vice versa.

An additional object of the invention is to provide novel and improved tools for use in an apparatus of the above outlined character.

A further object of the invention is to provide an apparatus which can automatically collect an exposed strip as well as the parts of its envelope so that the constituents of the envelope are classified according to their value and/or the need for additional or further treatment.

Still another object of the invention is to provide a novel and improved method of opening a flat elongated envelope which contains a strip of exposed photosensitive material or the like.

A further object of the invention is to provide an apparatus which can be used for the opening of envelopes wherein strips of X-ray film or the like are flanked by metallic foils.

An additional object of the invention is to provide an apparatus which occupies little room, whose operation can be automated to the desired extent, and which can treat the strips and the envelopes more gently than if the envelopes were manipulated and opened by hand.

The invention is embodied in an apparatus for removing strips, particularly strips of photosensitive material (such as X-ray film), from flat elongated envelopes or sheaths of the type having an open front end and first and second panels which flank the strip and are connected to one another along marginal portions of the strip. Each envelope can further contain first and second foils (e.g., such foils can be made of lead) which flank the strip and are inwardly adjacent to the respective panels of the envelope. The apparatus is preferably designed to remove strips of any one of two or more different widths, i.e., from flat envelopes having any one of two or more different widths.

The apparatus comprises substantially blade-like first and second tools which are insertable through the open front end of an envelope about to be relieved of its contents so as to penetrate between the strip and the respective (first and second) panels, transporting means for effecting relative movement between the tools and the envelope so that the tools penetrate deeper into the envelope, and severing means for opening the envelope lengthwise in the course of relative movement between the envelope and the tools, preferably along opposite marginal portions of the strip in the envelope. The transporting means preferably includes means for advancing the envelope and its contents lengthwise with reference to the tools along a predetermined path (preferably in a substantially vertical plane) and in a predetermined direction. For example, the transporting means can comprise a pair of advancing rolls defining a nip for one panel of the envelope which advances along its path, and such advancing rolls are disposed downstream of the severing means, as considered in the direction of transport of the envelope, so that the panel which advances through the nip of the rolls pulls the unopened part of the envelope toward the tools and into the range of the severing means. The severing means can comprise at least one knife having a cutting edge which is inclined with reference to the direction of advancement of the envelope. For example, the cutting edge and such direction can make an angle of between substantially 30 and 50 degrees, preferably an angle of between substantially 35 and 45 degrees. The severing means preferably comprises at least two knives which are or can be provided on one of the tools and are arranged so sever an advancing envelope along the marginal portions of the strip. The cutting edges of such knives face counter to the direction of advancement of the envelope and each thereof can make the aforementioned angle with such direction.

If the apparatus is designed to open envelopes having any one of two or more different widths, the severing means comprises a severing unit for each such width. The severing units can include a common knife which can be used for the opening of one edge portion of an envelope of any selected width, and each severing unit further comprises an additional knife. Such additional knives are disposed at different distances from the common knife, depending on the width of envelopes which are to be severed by the respective additional knives. The arrangement may be such that the tools are mounted on a horizontal table or an analogous support so that the one tool has a lower edge portion which is adjacent to the upper side of the support and carries the common knife. The additional knives are mounted on a second or upper portion of the one tool at different levels above the upper side of the support. The envelopes advance edgewise along the upper side of the support, i.e., an edge portion of an envelope which advances along the aforementioned path slides or can slide along the upper side of the support. The planes of the tools are preferably normal to the upper side of the support, and the second or upper portion of the one tool is preferably provided with several steps disposed one behind the other, as considered in the direction of advancement of the envelope along its path. Each additional knife is preferably mounted in the region of a different step.

The apparatus can further comprise preferably arcuate first and second deflectors which are disposed downstream of the severing means, as considered in the direction of advancement of the envelope, and serve to move the respective (first and second) panels of the opened portion of the envelope laterally of the path and away from each other. The deflectors are preferably disposed downstream of and can constitute integral parts of the respective tools so that successive portions of the first and second panels of an envelope advance first along the outer sides of the respective tools and thereupon along the outer sides of the respective deflectors which can direct the panels into a common collecting receptacle or into two discrete receptacles.

The apparatus can further comprise means for convoluting successive increments of the exposed strip which advances beyond the tools. The convoluting means can comprise a reel and means for rotating the reel at a variable speed. The arrangement is preferably such that the transporting means comprises a first prime mover (which drives at least one of the aforementioned advancing rolls) and the rotating means comprises a second prime mover and means for reducing the speed of the second prime mover in response to increasing diameter of the convoluted strip.

If an envelope contains foils which flank the strip therein, the tools are inserted in such a way that they are disposed between the respective (first and second) foils and the respective (first and second) panels so that the foils are free to advance with the strip and beyond the tools. The apparatus then preferably further comprises means for collecting the foils, e.g., in the region between the tools and the convoluting means. Suitable walls or analogous guide means can be provided downstream of the tools to direct the foils toward the collecting means. If the foils consist of or contain a metallic material (particularly lead), they can descend into the collecting means by gravity.

The novel features which are considered as characteristic of the inventiion are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 2 is a greatly enlarged fragmentary vertical sectional view as seen in the direction of arrows from the line II—II of FIG. 1; and FIG. 3 is an enlarged partial plan and partial horizontal sectional view of certain details in the apparatus of FIG. 1.

DESCRIPTION OF THE PREFERRED EMBODIMENTS

Figure 1:
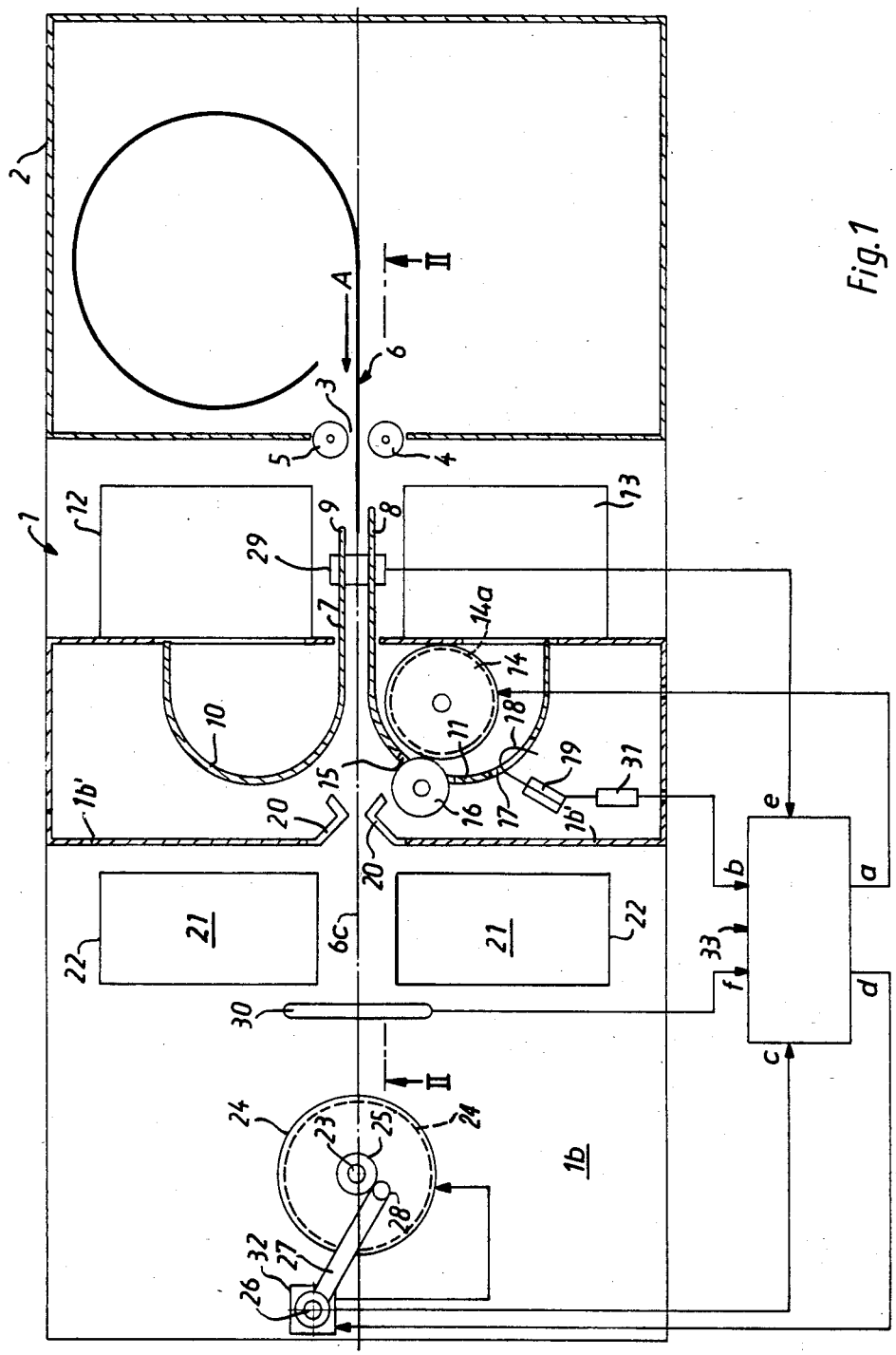
FIG. 1 is a schematic partial plan and partial horizontal sectional view of an apparatus which embodies the invention and is designed to open flat envelopes wherein the strip is confined between two metallic foils.

The apparatus which is shown in FIG. 1 comprises a horizontal table 1 or an analogous support whose upper side or surface 1b is disposed at a level below a container 2 for an elongated flat envelope or sheath 6. As can be seen in FIG. 3, the envelope 6 comprises two parallel panels 6a which consist of paper and/or synthetic plastic material and flank two metallic foils 6b which, in turn, flank a strip 6c of exposed photosensitive material, e.g., a strip of X-ray film which is tightly sandwiched between the foils. The envelope 6 is inserted into the container 2 in such a way that one edge thereof rests on the upper side 1b of the table 1. The container 2 has an outlet 3 which is flanked by two idler rollers 4, 5 constituting a means for guiding successive increments of the envelope 6 on their way from the interior of the container 2 and into an enlongated path which is adjacent to the upper side 1b of the table 1 and along which the envelope advances, first as a result of being pulled by hand and thereupon automatically under the action of a transporting unit including two advancing rolls 14, 16 and a prime mover 14a, e.g., a variable-speed electric motor. The guide rollers 4 and 5 are mounted for rotation about vertical axes.

The apparatus further comprises two flat elongated blade-like tools 7 and 8 which are disposed in vertical planes and are mounted on the table 1 downstream of the guide rollers 4, 5, as considered in the direction (arrow A) of advancement of the envelope 6 from the interiior of the container 2. The front end of the envelope 6 is open (as mentioned hereinbefore, the envelope 6 can constitute a length of a much longer envelope which is stored in convoluted condition and from which portions of requisite length are severed for exposure to X-rays prior to insertion into the container 2) so that the preferably rounded tips 7A and 8A of the tools 7 and 8 can be introduced into the interior of the envelope in such a way that the tool 7 extends between the panel 6a and the foil 6b at one side and the tool 8 extends between the panel 6a and the foil 6b at the other side of the strip 6c. The tips 7A, 8A of the tools 7 and 8 face the guide rollers 5, 4 and such tools are disposed in parallel vertical planes and rather close to one another. FIGS. 1 and 2 show that the distance between the tip 8A of the tool 8 and the guide roller 4 is less than the distance between the tip 7A of the tool 7 and the guide roller 5; such staggering of the tips 7A, 8A (as considered in the direction of advancement of the envelope 6 along the upper side 1b of the table 1) facilitates the introduction of tools 7, 8 into the open front end of the envelope 6.

The severing means 9 of the apparatus comprises three knives 9a, 9b, 9c which are mounted on the tool 7 behind the tip 7A (see FIG. 2) and whose elongated cutting edges face counter to the direction of advancement of the envelope 6 and are inclined with reference to this direction, preferably in such a way that they make therewith angles of between approximately 30 and 50 degrees, most preferably between approximately 35 and 45 degrees. The left-hand end portions of the tools 7 and 8 (as viewed in FIG. 1) respectively merge into arcuate deflectors 10 and 11 which serve to divert the respective panels 6a of the opened part of the envelope 6 into a pair of collecting receptacles 12, 13 in the form of bins disposed on the table 1 or below suitable windows in the table. If desired, the two receptacles 12, 13 can be replaced by a single bin.

The aforementioned advancing rolls 14, 16 are mounted on the table 1 at the opposite sides of the deflector 11. To this end, the deflector 11 has an opening or cutout 15 through which a portion of the advancing roll 16 extends. The roll 16 is preferably biased toward the roll 14 which latter can be driven by the prime mover 14a in response to signals transmitted thereto by the corresponding output a of a control unit 33. The radius of the larger advancing roll 14 is somewhat smaller than the radius of curvature of the deflector 11. The arrangement is such that a band passing through the nip of the advancing rolls 14, 16 and along the concave side of the deflector 11 would be close to or would actually contact a substantial portion of the peripheral surface of the roll 14.

The deflector 11 is formed with a second opening or cutout 17 for the suitably bent trip 18 of a microswitch 19 which is connected with the corresponding input b of the control unit 33 by way of a time-delay device 31. The microswitch 19 serves to transmit signals denoting the presence or absence of a panel 6a at the concave side of the deflector 11 downstream of the nip of the advancing rolls 14 and 16.

The deflectors 10, 11 are followed (as considered in the direction of arrow A) by two guide walls 20 which form part of upright shrouds 1b' and flank the path of the exposed strip 6c and of the foils 6b. The walls 20 are located upstream of two collecting vessels 21 for the foils. These vessels are mounted at a level below suitable windows 22 in the table 1.

The table 1 further supports a convoluting unit including a takeup reel having a vertical core 23, a horizontal flange 24 adjacent to the upper side 1b of the table 1, a prime mover 24a (e.g., a variable-speed electric motor) which can drive the core 23 at any one of a preferably infinite number of different speeds, and a speed regulating device 32 which can change the speed of the core 23 proportionally with increasing diameter of the strip 6c which is convoluted thereon. The speed regulating device 32 has a means for monitoring the diameter of the coiled strip 6c, and such monitoring means comprises a lever 27 which is pivotable about the axis of a vertical shaft 26 and carries a roller 28 normally biased (by a spring, not shown) into contact with the external surface of the outermost convolution of the strip 6c on the core 23. The lever 27 can adjust a potentiometer or the like (not specifically shown) which is connected with the corresponding input c of the control unit 33. The output d of the control unit 33 then transmits appropriate signals to the speed regulating device 32 whose output, in turn, transmits signals to the variable-speed prime mover 24a for the core 23. The latter is surrounded by a removable sleeve 25 which shares its angular movements and to which the leader of the strip 6c is connectable so that the strip is convoluted onto the sleeve 25 which is lifted off the core 23 when the opening of the envelope 6 is completed.

The control system of the apparatus further comprises a switch 29 which is adjacent to the path of movement of the envelope 6 in the region of the tools 7, 8 (behind the severing means 9, as considered in the direction of arrow A) and generates signals denoting the presence or absence of the envelope or its parts in the corresponding portion of the path. Such signals are transmitted to the input e of the control unit 33. A further switch 30 is disposed between the collecting vessels 21 and the flange 24 of the reel to generate signals denoting the presence or absence of the strip 6c; such signals are transmitted to the input f of the control unit 33.

The configuration of the tools 7, 8 and the construction of the severing means 9 are best shown in FIG. 2. The tip 8A of the tool 8 is a flat wedge which is bounded by edge faces making a relatively small acute angle. The lower edge face has a curved portion located downstream of the knife 9a of the severing means 9 and extending downwardly to a level below the horizontal upper side or surface 1b of the table 1. The upper edge face of the tip 8A curves upwardly behind the additional knives 9b, 9c of the severing means 9 so that it does not interfere with the severing action upon the envelope 6. The width (actually height) of the flat tip 8A increases in a direction from the guide roller 4 toward the reel including the core 23 and flange 24.

The tip 7A of the tool 7 is shorter than the tip 8A and is adjacent to a wider intermediate portion 7B of the tool 7. This intermediate portion is disposed between the knife 9a and the knife 9b, i.e., between the knives which serve to open the narrower of two or more types of envelopes which can be opened in the apparatus of FIGS. 1 to 3. The cutting edge 9a' of the knife 9a and the direction of advancement of the envelope 6 make an angle of between 30 and 50 degrees, preferably between 35 and 45 degrees, the same as the cutting edges 9b', 9c' of the two additional knives 9b and 9c. The cutting edge 9a' is mirror symmetrical to the cutting edges 9b', 9c' with reference to a horizontal plane which is parallel to the upper side 1b of the table 1 and is disposed between the knives 9a, 9b. A portion of the knife 9a extends into an aperture 1a of the table 1. The knives 9b and 9c are respectively adjacent to discrete steps or shoulders 7a which are provided in the upper portion of the tool 7 and are staggered with reference to one another, as considered in the direction of arrow A. It will be noted that the distance between the knives 9a, 9b is less than that between the knives 9a, 9c, i.e., the additional knives 9b, 9c are mounted on the tool 7 at different levels above the table 1. The knives 9a, 9b can be said to constitute a first severing unit for the opening of relatively narrow envelopes (narrower than the illustrated envelope 6), and the knives 9a, 9c can be said to constitute a second severing unit serving to open envelopes having a width matching or approximating that of the illustrated envelope 6. The lower portion of the tool 7 defines a step in the region of the knife 9a (which is common to both severing units), i.e., the lower edge face of the intermediate portion 7B of the tool 7 has a horizontal portion which is closely adjacent to the upper side 1b of the table 1, and a following portion which extends vertically or nearly vertically downwardly into the aperture 1a of the table 1. The foremost or rightmost step 7a of FIG. 2 is preceded by a slightly upwardly sloping edge face of the intermediate portion 7B of the tool 7. The distance between the lowermost and intermediate steps 7a exceeds the distance between the two upper steps 7a of the tool 7. The additional knife 9b is mounted in the region of the lowermost step 7a, and the additional knife 9c is mounted at a level between the two upper steps 7a.

The operation is as follows:

The envelope 6 with the exposed but undeveloped film strip 6c therein is inserted into the container 2 so that it lies on edge, and its open front end is thereupon threaded between the guide rollers 4, 5 and is advanced toward the tips 7A, 8A of the tools 7, 8. All this can be done by hand. The front end of the envelope 6 is open for the aforediscussed reason, i.e., this envelope normally constitutes a portion of a much longer envelope which is stored on a reel, not shown. If the illustrated envelope constitutes the foremost portion of such longer envelope, its front end is sealed by an adhesive tape or the like which is removed or cut off by the attendant so that the tips 7A and 8A of the tools 7 and 8 can be readily introduced into the front end of the envelope 6 in a manner as shown in FIG. 3. The attendant pushes the envelope 6 in the direction of arrow A so that the tip 8A of the tool 8 enters between the respective panel 6a and the respective foil 6b. Shortly thereafter, the tip 7A of the tool 7 enters between the other panel 6a and the adjacent foil 6b, i.e., the strip 6c and the foils 6b in the foremost portion of the envelope 6 are disposed in the relatively narrow gap between the tools 7 and 8. The presence of foils 6b (which preferably consist of or contain lead) is preferred but not absolutely necessary. The attendant continues to push the front end of the envelope 6 toward the convoluting station including the core 23 whereby the cutting edge 9a' of the lowermost knife 9a begins to sever the envelope in the region between the lower edges of the panels 6a (i.e., in the region of the lower marginal portion of the strip 6c) and, shortly thereafter, the cutting edge 9c' of the uppermost knife 9c begins to sever the panels 6a in the regions of their upper edges, i.e., close to the upper marginal portion of the strip 6c. If the envelope 6 is replaced by a narrower envelope, the upper edges of the panels of such narrower envelope are severed by the cutting edge 9b' of the knife 9b. The knife 9a is used irrespective of the width of the envelope.

The knives 9a and 9c open successive increments of the envelope 6 whereby the separated portions of the panels 6a advance along the outer sides of the respective knives 7, 8 and thereupon along the outer (concave) sides of the respective deflectors 10, 11 on their way into the collecting receptacles 12, 13. The leader of the lower panel 6a (as viewed in FIG. 1 or 3) enters the nip of the advancing rolls 14, 16 and advances beyond such nip to actuate the microswitch 19 through the medium of the readily flexible highly sensitive trip 18 in the cutout 17 of the deflector 11. The prime mover 14a is already in operation because it is set in motion as soon as the switch 29 transmits to the input e of the control unit 33 a signal denoting the presence of parts of the envelope 6 in the corresponding portion of the path. The switch 29 preferably further serves as a means for effecting the starting of prime mover 24a through the medium of the control unit 33.

It will be noted that the rolls 14, 16 can advance the respective panel 6a (and hence the entire envelope 6) as soon as the leader of the respective panel 6a enters the nip of these rolls because the switch 29 is located ahead of the opening 15. Thus, the leader of the respective panel 6a advances toward and actuates the microswitch 19 under the action of advancing rolls 14 and 16. The microswitch 19 generates a signal which is transmitted to the input b of and causes the control unit 33 to arrest the prime mover 14a with a certain delay which is determined by the time-delay element 31 and suffices to ensure that the primer mover 14a (together with the prime mover 24a) is arrested when the leader of the strip 6c is sufficiently close to the coiling or convoluting station so that it can be readily attached to the sleeve 25 on the core 23. At such time, the lever 27 is held in a retracted position so that the roll 28 is remote from the core 23 and sleeve 25. When the operator completes the attachment of the leader of the strip 6c to the sleeve 25, the lever 27 is pivoted to the illustrated position in which the roll 28 bears against the peripheral surface of the sleeve 25 or against the outer side of the innermost convolution of the strip 6c. Such pivoting of the lever 27 results in the transmission of a signal to the input c of the control unit 33 which restarts the prime movers 14a and 24a so that, from then on, the operation proceeds in a fully automatic way and the diameter of the convoluted strip 6c on the sleeve 25 increases. The bias of the roll 28 is selected in such a way that the convoluted strip 6c is held against clockspringing as well as that the convolutions of the strip 6c are closely adjacent to one another. The angular position of the lever 27 changes with increasing diameter of the convoluted portion of the strip 6c whereby the lever 27 initiates the generation of signals which are transmitted to the input c of the control unit 33. The output d of the control unit 33 transmits appropriate signals to the speed regulating device 32 which controls the speed of the prime mover 24a in such a way that the RPM of the core 23 decreases proportionally with increasing diameter of the convoluted portion of the strip 6c. In other words, the regulating device 32 ensures that the peripheral speed of the roll of convoluted strip 6c on the sleeve 25 is synchronized with the speed of the prime mover 14a which drives the advancing roll 14 and thus determines the speed of movement of successive increments of the envelope 6 out of the container 2.

When the trailing end of the strip 6c advances beyond the switch 30, the latter transmits to the input f of the control unit 33 a signal which arrests the prime mover 24a and preferably also the prime mover 14a. The operator then pivots the lever 27 to the aforementioned retracted position so that the sleeve 25 and the convoluted strip 6c can be removed from the convoluting station for transfer or transport into a developing machine, not shown. However, it is equally possible to leave a relatively short convoluted strip 6c and its sleeve 25 on the core 23 and to splice the trailing end of the convoluted strip 6c to the leader of the next-following strip. In this manner, one can form a relatively long composite strip of exposed photosensitive material which can be introduced into a modern high-speed developing machine.

The deflectors 10, 11 ensure automatic admission of the corresponding panels 6a into the respective collecting receptacles 12, 13. The foils 6b advance with the strip 6c toward the convoluting station and descend into the respective collecting vessels 21, preferably under the action of gravity (see FIG. 3). If necessary, the leaders of the foils 6b can be deflected by hand downwardly and through the respective windows 22 of the table; however, the major part of each foil 6b will or can descend by gravity, especially if these foils contain lead or another metal or alloy having a high specific weight. The walls 20 guide the foils 6b on their way toward the respective windows 22 which are disposed between the deflectors 10, 11 and the convoluting station for the strip 6c. The strip 6c is sufficiently stiff so that its leader remains in a substantially vertical plane on its way from the deflectors 10, 11 toward the sleeve 25 on the core 23.

The apparatus which is shown in FIGS. 1 to 3 is designed to open envelopes having two and preferably three different widths, e.g., envelopes having a width of 60, 70 or 100 mm. These are three customary standard widths of X-ray films. The difference between envelopes having a width of 60 mm and envelopes having a width of 70 mm is sufficiently small to allow for opening of such envelopes by the severing unit including the knives 9a and 9b. Envelopes having a width of 90 mm are opened by the severing unit including the knives 9a and 9c. It is clear that the apparatus of the present invention can be designed for the opening of a single type of envelope, for the opening of only two types of envelopes, or for the opening of four or more types of envelopes. This would merely entail an appropriate modification of the severing means 9 and of the tool 7 or tools 7 and 8.

An important advantage of the improved apparatus is that the envelope 6 can be opened without any contact between the strip 6c and the guiding and opening instrumentalities. Thus, if the strip 6c is flanked by foils 6b, its leader is the first strip part coming in contact with any components of the apparatus because the foils shield the strip at both sides during travel between the guide rollers 4, 5 and tools 7, 8, between the deflectors 10, 11 and between the guide walls 20. This prevents any scratching of and/or other damage to exposed photosensitive material. Moreover, the strip 6c is treated gently so that the apparatus is highly unlikely to cause pressure-induced exposures of photosensitive material. The likelihood of pressure-induced exposures is practically eliminated in view of the fact that the transporting means including the advancing rolls 14, 16 need not engage the strip 6c at all, i.e., such transporting means pulls one of the panels 6a to thereby advance the entire envelope 6 along its prescribed path so that the leader of the strip 6c reaches the convoluting station.

An additional important advantage of the apparatus is that it can automatically classify the constituents of the envelope 6. Thus, the normally disposable panels 6a are admitted into the receptacles 12, 13 and the normally reusable foils 6b are introduced into separate collecting means (such as the illustrated vessels 21). This eliminates the need for time-consuming manual classification of separated parts of the envelope. Accumulation of foils 6b independently of the panels 6a is advisable even if the foils are not reused because the material of the foils should not be disposed of together with the material of the panels for ecological reasons. As mentioned above, the foils 6b normally do or can contain lead.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for removing strips, particularly strips of photosensitive material, from flat envelopes each having an open front end, and first and second panels which flank a strip in the envelope and are connected to one another along marginal portions of the strip, said apparatus comprising substantially blade-like first and second tools insertable through the open end of an envelope so as to penetrate between the respective panels and the strip in the envelope; transporting means for effecting relative movement of the tools and the envelope so that the tools penetrate into the envelope; and severing means for cutting the envelope open along at least one marginal portion of the strip in the course of relative movement of the envelope and the tools while the latter are disposed between the respective panels and the strip.

2. The apparatus of claim 1, wherein said transporting means includes means for advancing the envelope and its contents with reference to the tools in a predetermined direction and along a predetermined path.

3. The apparatus of claim 2, wherein said severing means comprises at least one knife having a cutting edge which is inclined with reference to said direction.

4. The apparatus of claim 2, wherein said severing means comprises a pair of knives provided on one of said tools and arranged to cut the advancing envelope open along both marginal portions of the strip therein.

5. The apparatus of claim 4, wherein said knives have cutting edges which are inclined with reference to said direction.

6. The apparatus of claim 4, wherein said knives have cutting edges facing counter to the direction of advancement of the envelope along said path.

7. The apparatus of claim 2 for removing strips from flat envelopes which define compartments having different widths, wherein said severing means comprises a discrete severing unit for each of said different widths.

8. The apparatus of claim 7, wherein said units include a common knife and each of said units further includes an additional knife, said additional knives being disposed at different distances from said common knife, as considered transversely of said direction.

9. The apparatus of claim 8, further comprising a support having an upper side along which the envelopes advance edgewise with reference to said tools, said common knife being adjacent to said upper side and said additional knives being disposed at different levels above said support.

10. The apparatus of claim 9, wherein said knives are mounted on one of said tools and said tools are disposed in planes which are substantially normal to said upper side, said one tool having a lower portion supporting said common knife and an upper portion supporting said additional knives.

11. The apparatus of claim 10, wherein the upper portion of said one tool has several steps disposed one behind the other, as considered in said direction, and at different levels above said support, each of said additional knives being mounted in the region of a different step.

12. The apparatus of claim 2, wherein said severing means comprises a plurality of knives having cutting edges making with said direction angles of between approximately 30 and 50 degrees.

13. The apparatus of claim 12, wherein at least one of said angles is between 35 and 45 degrees.

14. The apparatus of claim 2, wherein said transporting means includes a pair of advancing rolls defining a nip for one panel of the envelope which is transported in said direction.

15. The apparatus of claim 14, wherein said advancing rolls are disposed downstream of said severing means, as considered in said direction.

16. The apparatus of claim 2, further comprising first and second deflectors disposed downstream of said severing means, as considered in said direction, and arranged to move the respective panels of the envelope in said path laterally of said path and away from each other.

17. The apparatus of claim 16, wherein said deflectors are disposed downstream of the respective tools, as considered in said direction, so that successive portions of the first and second panels of the envelope in said path respectively advance first along the first and second tools and thereupon along the first and second deflectors.

18. The apparatus of claim 2, further comprising means for convoluting successive increments of the strip which advances along said path and beyond said tools.

19. The apparatus of claim 18, wherein said convoluting means comprises a reel and means for rotating said reel at a variable speed.

20. The apparatus of claim 19, wherein said transporting means comprises first prime mover means and said rotating means comprises variable-speed second prime mover means, said rotating means further comprising means for reducing the speed of said second prime mover means in response to increasing diameter of the convoluted strip.

21. The apparatus of claim 2 for removing strips from flat envelopes wherein a strip is flanked by first and second foils which are inwardly adjacent to the respective panels, wherein said tools are arranged to enter an envelope between the respective foils and the respective panels so that the foils are free to advance with the strip beyond said tools.

22. The apparatus of claim 21, further comprising means for convoluting successive increments of the strip which advances along said path beyond said tools, and means for collecting the foils intermediate said tools and said convoluting means.

23. The apparatus of claim 22, further comprising guide means for the foils, said guide means being disposed downstream of said tools and ahead of said collecting means.

24. The apparatus of claim 22, wherein the foils contain a metallic material, such as lead, and are arranged to enter said collecting means by gravity.

25. The apparatus of claim 1, wherein said tools are generally parallel to one another and to the strip.

26. The apparatus of claim 1, wherein said severing means is arranged to cut the envelope open from inside the latter.

27. The apparatus of claim 16, wherein said deflectors are arcuate.

28. The apparatus of claim 16, wherein each of said deflectors is of one piece with and constitutes an extension of a respective tool.

29. Apparatus for removing strips, particularly strips of photosensitive material, from flat envelopes which define compartments having different widths, each of the envelopes having an open front end, and first and second panels which flank a strip in the respective compartment and are connected to one another along marginal portions of the strip, said apparatus comprising substantially flat, generally parallel, blade-like first and second tools insertable through the open end of an envelope so as to penetrate between the respective panels and the strip in the envelope; transporting means for advancing the envelope and the strip with reference to the tools in a predetermined direction and along a predetermined path so that the tools penetrate into the envelope; severing means for cutting the envelope open along both marginal portions of the strip in the course of relative movement of the envelope and the tools while the latter are disposed between the respective panels and the strip; first and second deflectors disposed downstream of said severing means, each of said deflectors also being located downstream of a respective tool, and said deflectors being arcuate and being arranged to move the respective panels of the envelope away from one another laterally of said path; take-up means for convoluting the strip upon removal from the envelope, said take-up means including a reel, and operating means for rotating said reel at variable speed, and a support having an upper side along which the envelope advances edgewise so that the strip is disposed in a predetermined plane which is substantially normal to said upper side, said tools being generally parallel to the plane of the strip, and one of said tools having a lower portion in the region of said upper side, and an upper portion provided with a plurality of steps which are located at different levels above said upper side, said severing means comprising a first knife which is mounted on said lower portion at approximately the level of said upper side to cut the envelope open along one marginal portion of the strip, and a plurality of second knives each of which is arranged to cut the envelope open along the other marginal portion of the strip and each of which is mounted on said upper portion in the region of a different step so as to be separated from said first knife by a distance at least approximating one of the different widths, and each of said knives having a cutting edge which faces counter and is inclined with reference to said predetermined direction.

* * * * *